United States Patent [19]

Elliott, Jr.

[11] 4,164,551
[45] Aug. 14, 1979

[54] PREPARATION OF ZEOLITE

[75] Inventor: Curtis H. Elliott, Jr., Baltimore, Md.

[73] Assignee: W. R. Grace & Co., New York, N.Y.

[21] Appl. No.: 862,031

[22] Filed: Dec. 19, 1977

[51] Int. Cl.² .......................................... C01B 33/28
[52] U.S. Cl. .................................... 423/330; 423/329
[58] Field of Search ............................ 423/328–330, 423/118; 252/455 Z

[56] References Cited

U.S. PATENT DOCUMENTS

| | | | |
|---|---|---|---|
| 3,359,068 | 12/1967 | Michalko | 423/329 |
| 3,459,501 | 8/1969 | Plank et al. | 423/328 |
| 3,574,538 | 4/1971 | McDaniel et al. | 423/329 |
| 3,639,099 | 2/1972 | Elliott et al. | 423/330 |
| 3,898,319 | 8/1975 | Weber | 423/329 |

Primary Examiner—Edward J. Meros
Attorney, Agent, or Firm—Arthur P. Savage

[57] ABSTRACT

Crystalline aluminosilicate Type Y zeolite is prepared by reacting silica, alumina, sodium hydroxide and water to produce a slurry of Type Y zeolite and excess silicate containing mother liquor. Silicate is recovered from the mother liquor as precipitated silica/alumina hydrogel by the addition of an acid aluminum salt such as aluminum sulfate. The precipitated silica/alumina hydrogel is used in the zeolite reaction step as a source of silica and alumina.

4 Claims, 1 Drawing Figure

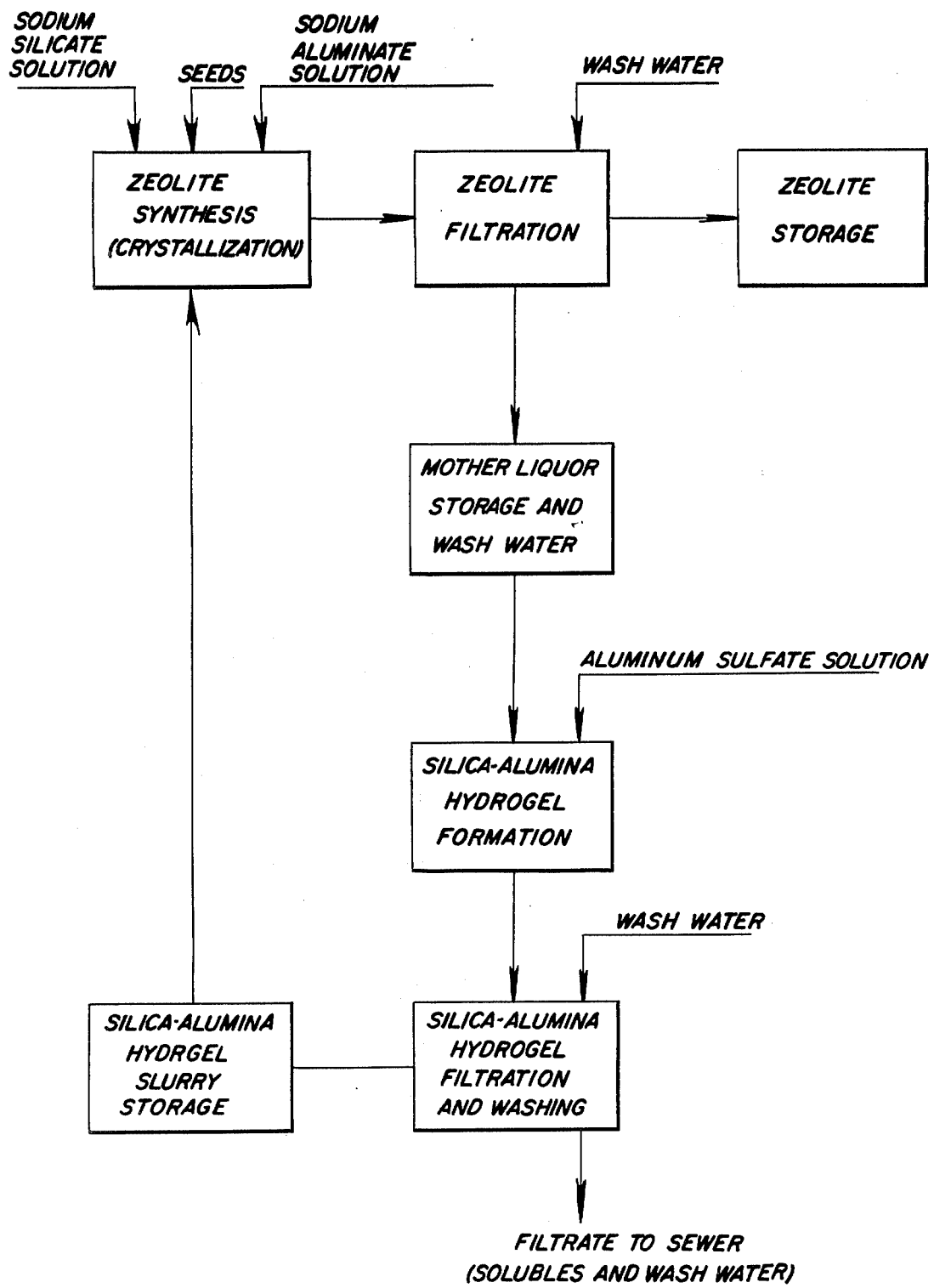

PREPARATION OF ZEOLITE

The present invention relates to the synthesis of crystalline aluminosilicate zeolites and more specifically to a process for preparing Type Y zeolite wherein excess silicate, usually lost to the sewer, is recovered and recycled to subsequent syntheses.

Crystalline aluminosilicate zeolites such as Type Y zeolite are commercially prepared by reacting a source of silica and alumina, sodium hydroxide and water at temperatures of about 100° C. In general, the zeolite formation reaction requires a substantial excess of both silica and sodium hydroxide which remains in the crystallization mother liquor and which must be ultimately utilized or discarded.

Disposal of considerable quantities of silica and sodium hydroxide as dilute sodium silicate solution represents both a considerable economic waste and a substantial pollution control problem. Previous attempts to recycle the excess sodium silicate solution to a Type Y zeolite synthesis process have not been particularly successful in that excess water associated with the mother liquor tends to produce inferior or no zeolite product. Typical methods for utilization of zeolite crystallization mother liquor are set forth in the following references:

U.S. Pat. No. 3,898,319 to Weber discloses a method for utilizing waste liquor obtained in a Type Y zeolite synthesis wherein the excess silicate is recovered as solid amorphous silica by precipitation with carbon dioxide. The precipitated silica is then utilized to prepare additional Type Y zeolite.

U.S. Pat. No. 2,882,244 to Milton discloses the preparation of Type X zeolite by a process wherein it is suggested that the mother liquor may be reused after enrichment with proper amounts of reactants to give a properly proportioned reaction mixture.

It is therefore an object of the present invention to provide an improved method for preparing crystalline aluminosilicate zeolites.

It is another object to provide a method by which the excess silicate present in zeolite mother liquor may be economically and efficiently utilized to produce additional zeolite.

It is still a further object to provide economic feasible method for preparing commercial quantities of Type Y zeolite wherein silicate is fully utilized and waste process effluents containing silicate are essentially eliminated.

These and still further objects of the present inventions will become readily apparent to one skilled in the art from the following detailed description and drawing which depicts a flow-chart diagram of a zeolite synthesis process of the present invention.

Broadly, my invention contemplates a Type Y zeolite manufacturing process wherein zeolite crystallization mother liquor which contains excess silicate is combined with an acid aluminum salt to obtain a precipitated silica-alumina hydrogel that is used to produce more zeolite.

More specifically, I have found that the excess silicate present in the Type Y zeolite crystallization mother liquor may be economically recovered in the form of a precipitated silica-alumina hydrogel which may be recycled and efficiently utilized in a Type Y zeolite crystallization reaction.

By precipitating and recovering mother liquor silica as freshly precipitated reactive silica-alumina hydrogel and discarding excess water from the steps of filter recovery of Type Y zeolite product, filter wash water and aluminum sulfate precipitation, a waste product is converted into a recyclable raw material of high reactivity for Type Y zeolite production, and the water balance necessary for this recycling to the process is maintained.

A more clear understanding of my invention may be obtained by by reference to the drawing which sets forth a flow-chart of a typical zeolite preparation process which incorporates my present invention. In the process set forth in the drawing a zeolite synthesis, i.e., crystallization, reaction mixture yields a finely divided zeolite suspended in mother liquor which is subjected to a filtration step. During the filtration the zeolite product is recovered and washed with water and subsequently sent to zeolite storage. The filtrate and washings from the zeolite filtration step are then conducted to mother liquor storage. The mother liquor at this point comprises primarily a relatively dilute solution of sodium silicate in water. In addition, the mother liquor contains minor quantities of alumina as well as finely divided particles of zeolite. From mother liquor storage the mother liquor is conducted to a tank to which an appropriate amount of acid aluminum salt solution (preferably aluminum sulfate solution) is added. Upon addition of the aluminum sulfate the silicate present in the mother liquor reacts to form a finely divided silica/alumina hydrogel. Gelation is most effective at Ph 6 to 7. The silica/alumina hydrogel which precipitates from the solution is recovered by a filtration step as indicated in the drawing, and the silica/alumina hydrogel is washed with water to remove excess sodium sulfate solution. The sodium sulfate solution is then discarded or further utilized as desired. The silica/alumina hydrogel which at this point comprises a filter cake containing approximately 15–22 percent solids is then placed in a silica/alumina hydrogel slurry storage tank.

As indicated in the drawing the silica/alumina hydrogel slurry, which contains from about 10 to 13 percent by weight silica, 2 to 3 percent by weight alumina, and 78 to 85 percent by weight water, the rest being $Na_2O$ and $Na_2SO_4$, is utilized in the zeolite synthesis reaction. Typically the hydrogel is pumped from storage to a crystallization zeolite crystallization reactor in which additional reactants are added such as sodium silicate solution, sodium aluminate solution and preferably finely divided zeolite nucleation centers, i.e. seeds.

A typical Type Y zeolite synthesis reaction mixture is set forth in U.S. Pat. No. 3,639,099 to Elliott, et al. Typically the reaction mixture will contain the following molar ratios reactants: 3 to 6 $Na_2O:Al_2O_3$:8 to 12 $SiO_2$:120 to 200 $H_2O$. This mixture is obtained by mixing solutions of sodium silicate, sodium aluminate and the aforementioned silica/alumina hydrogel which is obtained by combining an acid aluminum salt with the alkaline metal silicate constitutents present in zeolite crystallization mother liquor. In addition the reaction mixture may contain zeolite nucleation centers having an average particle size below about 0.1 micron which are prepared from a reaction mixture comprising $SiO_2$, $Al_2O_3$, $Na_2O$, and $H_2O$ in amounts which range from about 0.1 to 10 percent by weight of the reaction mixture. The Type Y zeolite synthesis is conducted by heating at temperatures of about 100° C. to 105° C. for a time long enough to obtain crystallization, typically from 10 to 18 hours.

The nucleation centers which are utilized in a preferred practice of the present invention will be prepared from a reaction mixture where the reactants are present in the following molar ratios:

$SiO_2$ to $Al_2O_3$ 14 to 16
$Na_2O$ to $Al_2O_3$ 15 to 17
$H_2O$ to $Na_2O$ 19 to 21

Type Y zeolite produced by the process of my invention may be used to prepare fluid catalytic cracking catalysts which contain Type Y zeolite in a mixture with inorganic matrix components.

Having described the basic aspects of my invention the following example is given to illustrate a specific embodiment thereof.

EXAMPLE

Using the process outlined in the drawing Type Y zeolite was prepared as follows:

A nucleation center (seed) slurry was prepared as follows:

8.7 lbs. of commercial aluminum trihydrate was dissolved in 101.5 lbs. of commercial 50 percent sodium hydroxide solution previously heated to 210° F. The temperature was maintained until solution was complete after which the sodium aluminate solution was cooled to 80° F.

177.5 lbs. of 40 percent Be sodium silicate ($SiO_2/Na_2O = 3.36$) was diluted with 143.3 lbs. water and the mixture was cooled to 80° F.

The sodium aluminate solution was slowly added to the dilute silicate solution being careful to keep the mixture temperature below 90° F. and the mixture well agitated. Agitation was continued for half an hour after the two solutions were mixed. The agitator was turned off and the mixture aged for 16 hours at 90° F.

The reactant mol ratio is as follows:

1 $Al_2O_3$:16 $Na_2O$:15 $SiO_2$:320 $H_2O$

A Type Y zeolite synthesis batch was prepared as follows:

A total of 341.4 lbs. of 41° Be sodium silicate solution ($SiO_2/Na_2O$ ratio=3.36) was diluted with 100 lbs. of water. The dilute silicate solution was mixed with 92.2 lbs. commercial aluminum sulfate solution ($Al_2O_3=7.5\%$). A sodium aluminate solution was prepared by dissolving 19.2 lbs. of commercial aluminum trihydrate in 27.4 lbs. of commercial 50% sodium hydroxide previously heated to 220° F. and maintained at this temperature until total solution occurred. The solution was diluted with 44 lbs. of water and cooled to 100° F. The sodium aluminate solution was added to the previous silicate and alum mixture. Then 78.4 lbs. of nucleation centers were added to the other reactants. The reaction slurry had the following mol ratio:

1 $Al_2O_3$:3.1 $Na_2O$: 9.1 $S.O_2$:143 $H_2O$

The slurry of components was agitated and heated to 212° F. and maintained at this temperature for 16 hours. X-ray diffraction pattern of the product showed it contained 99 percent Y zeolite and a mol $SiO_2/Al_2O_3$ ratio of 5.0.

Subsequent to reaction at 100° C. for 16 hours a Type Y zeolite was recovered by filtration and a zeolite crystallization mother liquor was obtained which contained the following: 4.6 percent by weight $Na_2O$, 8.8 percent by weight $SiO_2$, <0.1 percent by weight $Al_2O_3$, 86.6 percent by weight water. The Type Y zeolite was washed with 350 lbs. of water and this water was added to the mother liquor filtrate.

594 lbs. of the above mother liquor filtrate was combined with 142 lbs. of aluminum sulfate solution which contained 7.5 percent by weight $Al_2O_3$. On addition of the aluminum sulfate, a silica-alumina hydrogel formed which was recovered by filtration. The hydrogel was washed with 350 lbs. of water to remove soluble sodium sulfate. The precipitated silica alumina hydrogel was found to contain 12.1 percent by weight $SiO_2$ and 2.66 percent by weight $Al_2O_3$.

A Type Y zeolite synthesis was prepared by combining 266.7 lbs. of the silica alumina hydrogel obtained above with 115.3 lbs. of sodium silicate solution which contained 8.9 percent by weight $Na_2O$, 29.1 percent by weight $SiO_2$; 51.85 lbs. of the seed preparation described above; and 23.3 lbs. of sodium aluminate solution which contained 5.6 lbs. by weight $Na_2O$ and 5.5 lbs. by weight $Al_2O_3$. The mixture was maintained at a temperature of 100° C. for 11½ hours. The reactant mol ratio was:

1 $Al_2O_3$:3.3 $Na_2O$: 9.1 $S.O_2$:142 $H_2O$

The Type Y zeolite which formed was recovered by filtration and was found to have a mol silica/alumina ratio of 5.3 and a crystallinity of 101 percent as measured by X-ray diffraction means. Cell size was 24.62A° and $N_2$ surface area was 868 $m^2/g$. The crystallization mother-liquor recovered from the batch was found to contain the following: 5.1 percent by weight $Na_2O$, 8.2 percent by weight $SiO_2$, <0.1 percent by weight $Al_2O_3$ and 86.7 percent by weight water. This mother liquor combined with wash water from Y filtration was reacted with aluminum sulfate solution as indicated above and the recovered silica alumina hydrogel was combined with additional make-up ingredients to prepare a zeolite synthesis batch as indicated above. Recovery of the zeolite and mother liquor from several batches indicated that the zeolite was of consistent quality, i.e. essentially the same as that prepared without the use of silica alumina hydrogel and that prepared using the silica alumina hydrogel previously recovered. Hence it is concluded that my process represents a means by which Type Y zeolite of a high quality may be produced using the recovered silicate values from crystallization mother liquor.

The above example clearly illustrates that crystalline alumino silicates of consistently high quality may be prepared using silica alumina hydrogel which is recovered from Y zeolite crystallization mother liquor.

What is claimed is:

1. A process for preparing Type Y zeolite which comprises:
   (a) preparing a reaction mixture containing the following mol ratio of reactants:
   3 to 6 $Na_2O$: 8 to 12 $SiO_2$:$Al_2O_3$:120 to 200 $H_2O$;
   (b) including in said reaction mixture zeolite nucleation centers having the following mol composition:
   15 to 17 $Na_2O$: 14 to 16 $SiO_2$:$Al_2O_3$:285 to 357 $H_2O$;
   (c) heating said mixture to obtain Type Y zeolite and mother liquor which contains silicate;
   (d) separating said Type Y zeolite from the mother liquor, and reacting said mother liquor with sufficient aluminum sulfate to precipitate substantially all the silicate as silica-alumina hydrogel;
   (e) recovering and washing said hydrogel to remove sodium sulfate therefrom; and (f) including said hydrogel as part of the reaction mixture prepared in step (a).

2. The process of claim 1 wherein said reaction mixture of step (a) is prepared by combining the silica-alumina hydrogel of step (e) with sodium silicate, sodium aluminate, water and nucleation centers.

3. The process of calim 1 wherein the heating step (c) is conducted at a temperature of about 100° to 105° C.

4. The process of claim 1 wherein the silica-alumina hydrogel is recovered by filtration, and the filtrate is discarded as a substantially silicate-free effluent.

* * * * *